United States Patent [19]

Hile

[11] 4,268,947
[45] May 26, 1981

[54] METHOD OF SECURING A CAPILLARY TUBE PASSING THROUGH A WALL

[75] Inventor: James R. Hile, Kirkville, N.Y.

[73] Assignee: Carrier Corporation, Syracuse, N.Y.

[21] Appl. No.: 969,507

[22] Filed: Dec. 14, 1978

Related U.S. Application Data

[62] Division of Ser. No. 828,447, Aug. 29, 1977, Pat. No. 4,175,402.

[51] Int. Cl.³ .............................................. B23P 11/02
[52] U.S. Cl. ........................................ 29/451; 29/450; 29/453; 16/2; 277/1
[58] Field of Search .......................... 29/235, 451, 453; 277/1; 16/2; 62/262, 263

[56] References Cited

U.S. PATENT DOCUMENTS

| | | | |
|---|---|---|---|
| 3,001,007 | 9/1961 | Klumpp, Jr. et al. | 16/2 X |
| 3,065,004 | 11/1962 | Laich | 16/2 X |
| 3,135,535 | 6/1964 | Shepard | 16/2 X |
| 3,611,743 | 10/1971 | Manganaro | 62/262 X |
| 3,887,960 | 6/1975 | Sherman | 16/2 |
| 3,991,446 | 11/1976 | Mooney et al. | 16/2 X |
| 4,089,496 | 5/1978 | Mizusawa | 16/2 X |

FOREIGN PATENT DOCUMENTS 1122395 8/1968 United Kingdom .......................... 16/2

Primary Examiner—Charlie T. Moon
Attorney, Agent, or Firm—J. Raymond Curtin; Robert P. Hayter

[57] ABSTRACT

Apparatus and a method for securing capillary tubes and other small diameter components within a refrigeration machine. A capillary plug button having a retainer plate in which various small diameter components may be secured has extending therefrom a pair of fastening legs. The fastening legs are inserted through an opening within an internal wall of the refrigeration machine such that projections on the legs contact one side of the wall and the retainer plate contacts the opposite side of the wall thereby securing the plug button within the opening and securing the small diameter components within the retainer plate. The retainer plate has a slot connecting the edge of the plate to a plurality of apertures thereby allowing the plug button to be spread apart such that the components may be inserted into the apertures of the retainer plate.

2 Claims, 4 Drawing Figures

METHOD OF SECURING A CAPILLARY TUBE PASSING THROUGH A WALL

This is a division of application Ser. No. 828,447 filed Aug. 29, 1977 now U.S. Pat. No. 4,175,402 issued Nov. 27, 1979.

BACKGROUND OF THE INVENTION

1. Field of the Invention

The present invention relates to refrigeration apparatus and particular to a capillary plug button for securing capillary tubes and other small diameter components within an opening in an internal wall of a refrigeration machine.

2. Description of the Prior Art

Various refrigeration machines arranging in size from room air conditioners that are typically mounted in a window or through the wall to large roof top units often use capillary tubes as an expansion control device within a conventional refrigeration circuit. Other small diameter tubes are used for various control mechanisms within the refrigeration machine. Particularly, high and low pressure switches are actuated through a small diameter tube connected to the various components within the refrigeration machine at the point from which pressure is to be determined. Other small diameter components such as wires or levers are also found within a refrigeration machine and consequently may be secured by a capillary plug button.

These various small diameter tubes may be free standing within the machine between the connections at either end. When these tubes are free standing there is potential for rubbing between themselves and between the tubes and the other internal components of the machine due to vibrations during operation as well as other movement during transportation of the machine. The rubbing motions create a possibility of the tubes being damaged or having holes worn therein. Typically refrigerant is contained within a capillary tube so that any damage to the capillary may result in loss of refrigerant for the refrigeration system or, if the damage is to a pressure sensitive device, replacement of the device may be necessitated. Furthermore electrical wiring within a refrigeration machine may rub against other components such that the insulation is worn thin creating the potential for a short circuit.

These capillary tubes have previously been secured within a refrigeration machine by the provision of a plastic clip that would encircle each capillary and be screwed to a component of the machine. Such apparatus requires a separate screw for each tube to be secured and for each location of that tube to be secured as well as requiring that the screw be removed from the clip to allow the capillary tube to be removed from the equipment. Other methods of securing capillary tubes within an opening of a wall include using a rubber gromet sized to the opening and to the tube.

SUMMARY OF THE INVENTION

It is an object of the present invention to provide a capillary retaining button for securing capillary and other small diameter components within a refrigeration machine.

It is another object of the present invention to have a capillary plug button for securing capillary tubes within openings in internal walls of a refrigeration machine that does not require the use of a screw or other separate fastening devices.

It is another object of the present invention to manufacture a cheap, efficient and economical capillary plug button which may be used with various diameter internal components of a refrigeration machine.

It is a further object of the present invention to provide a capillary plug button which may be interchangeably used in the various sized refrigeration machines.

It is a further object of the present invention to seal an opening within an internal wall of a refrigeration machine while simultaneously allowing a small diameter component to pass therethrough.

A still more specific object of the present invention invention is to manufacture a capillary plug button having a slot connected to various apertures therein so that components may be easily slid into the plug button to be secured therein.

Other objects will be apparent from the description to follow and from the appended claims.

The preceding objects are achieved according to the preferred embodiment of the invention by the provision of a retainer plate having extending therethrough a slot connected to various apertures such that the component to be secured may be slid through the slot into the apertures. Extending from the retainer plate are a pair of fastening legs which are designed to be inserted through the opening within the wall. The fastening legs have projections extending therefrom, the projections contacting one side of the wall such that the plug button is secured within the opening. The fastening legs have an inclined insertion surface thereon such that when the plug is slid into the opening the legs are compressed. Thereafter when the plug button is fully inserted the fastening legs are allowed to snap back to their original position to secure the button within the opening.

DESCRIPTION OF THE PREFERRED EMBODIMENT

The embodiment of the invention described below is adapted for use in varying sizes of refrigeration machines. It is to be understood that this capillary plug button is specifically designed to be interchangeable in numerous machines and consequently it is provided with component retainer apertures of varying sizes. Depending upon the number of different size capillary tubes being utilized it is expected that a small number of plug buttons having varying sized openings should be sufficient to secure capillary tubes throughout the range of refrigeration machines from the smallest room air conditioner to the largest commercial installation. It is to be further understood that the present capillary plug button may be utilized to secure other small diameter components within the refrigeration machine such as wires, levers or rods.

In a typical vapor compression refrigeration cycle a compressor is used to increase the pressure and temperature of the gaseous refrigerant. The now hot gaseous refrigerant is cooled in a condenser and changes state to a liquid. The liquid refrigerant is then passed through an expansion control device which decreases the pressure of the refrigerant. The then decreased pressure refrigerant is converted from a liquid to a gas in an evaporator absorbing heat from the fluid to be cooled in the process, said gaseous refrigerant then returning to the compressor to commence the same cycle again. The expansion control device may take several forms, including a small diameter tube known as a capillary tube. The capillary tube has such a small inside diameter and consequent high pressure drop over its length, that the high pressure refrigerant received from the condenser is discharged as low pressure refrigerant into the evaporator. Other small diameter capillary tubes are found in the refrigeration machine for monitoring the refrigeration cycle. The typical example would be either a high pressure or low pressure limit switch or guage, said switch being connected to the portion of the refrigeration cycle to be monitored by a capillary tube which would then contain refrigerant at the pressure in the area being monitored to indicate said pressure to the switch.

Typically, in a room air conditioner a partition is provided between the condenser and evaporator such that the cold temperature and warm temperature regions of the air conditioner are separated. It would be a typical application of the present plug button to secure capillary tubes within an opening through the partition. Other applications would include securing the capillary tubes entering control boxes or similar type enclosures wherein there is an opening through the wall of the enclosure through which the capillary tube must pass.

Figure 1:
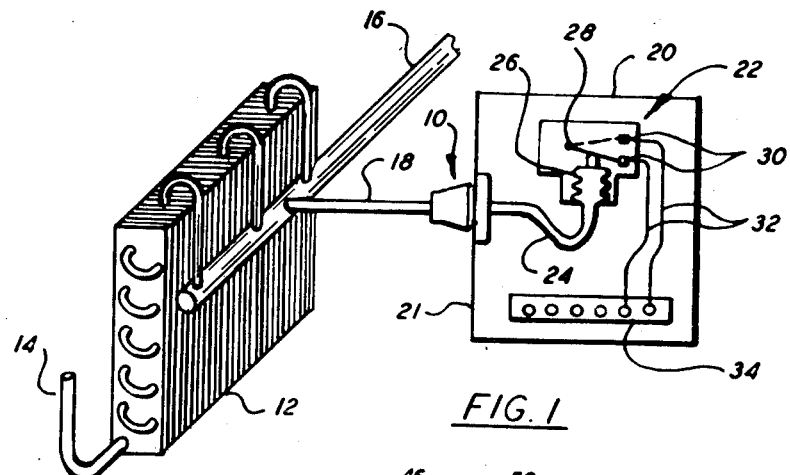
FIG. 1 is a pictorial schematic view of a refrigeration machine having the present invention.

Referring to the drawings, FIG. 1 shows in schematic form a heat exchanger 12 which receives refrigerant through pipes 14 and discharge refrigerant through the pipe 16. Connected to pipe 16 is capillary tube 18 for monitoring the pressure of the refrigerant within pipe 16. Capillary 18 through capillary plug button 10 which is mounted in an opening in wall 21 of control box 20. The extension of capillary 18 on the opposite side of the plug button 10 is denoted as capillary 24 which is connected to overpressure switch 22. Within overpressure switch 22 is lever arm 28 which is actuated by diaphram 26. The lever arm 28 is moved by the diaphram such that it contacts electrical contact 30, contact 30 energizes 32 which operates to shut down the refrigeration machine or otherwise act in response to the overpressure sensed by the overpressure switch. Terminal strip 34 is shown within control box 20 to indicate that a typical control box might have electrical connections as well as refrigerant pressure operated devices.

Figure 2:
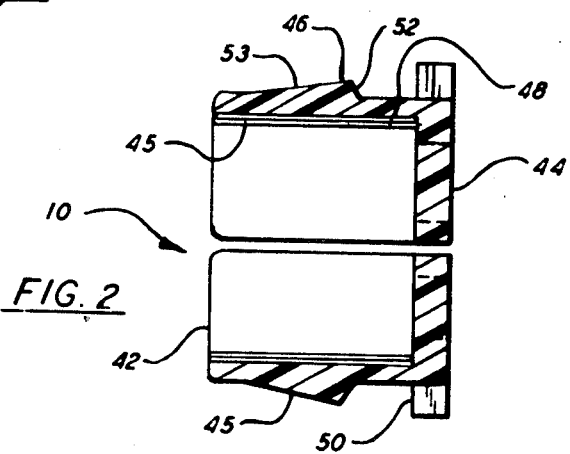
FIG. 2 is a cross sectional view of the capillary plug button.

In FIG. 2 the capillary plug button is shown in cross section. Retainer plate 44 is shown having fastening legs 45 extending therefrom. On each fastening leg is projection 46 having a projection contact surface 52 and a projection insertion surface 53. Also shown thereon are retainer plate contact surface 50 and wall slot 48, wall slot 48 being designed to receive wall 21 such that wall 21 is contacted by retainer plate contact surface 50 on one side and by projection contact surface 52 on the opposite side.

Figure 3:
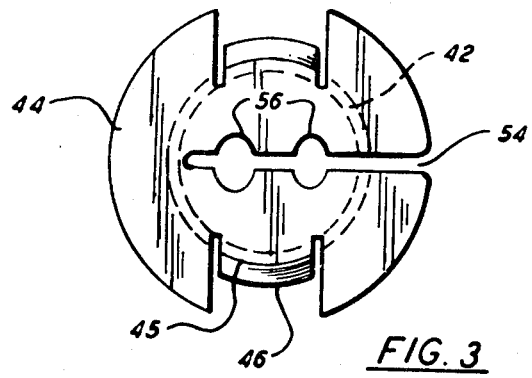
FIG. 3 is an end view of the capillary plug button.

Referring to FIG. 3, it can be seen that the capillary plug button has contained within retainer plate 44 capillary slot 54 and capillary apertures 56 of varying diameters. It can also be seen thereon that projections 46 on fastening legs 45 are separated from the remaining cylindrical body 42 of the plug button. To utilize this capillary plug button the retainer plate 44 is spread so that the capillary tube or other component to be secured is slid through capillary slot 54 into the capillary apertures 56. The retainer plate is then allowed to return to its original position securing the component therein. The entire capillary plug button is then inserted into the opening in the wall fastening legs first. As the fastening legs are inserted projection insertion surface 53 contacts the edges of the opening and since the surfaces are inclined forces the fastening legs to be displaced inwardly as the plug button is further inserted. Once the plug button is inserted such that the projection insertion surfaces 53 are beyond wall 21, fastening legs 45 will then spring back to their original position such that projection contact surface 52 is on one side of wall 21 and retainer plate contact surface 50 is on the other side of wall 21. By the location of these two surfaces and the fastening leg, the plug button is secured within the opening and consequently the capillary tubes or other components to be secured are fixedly maintained within the plug button within the opening. In the usual application the capillary tube is mounted first in the opening and then the capillary plug button is inserted to secure the capillary tube therein.

Figure 4:
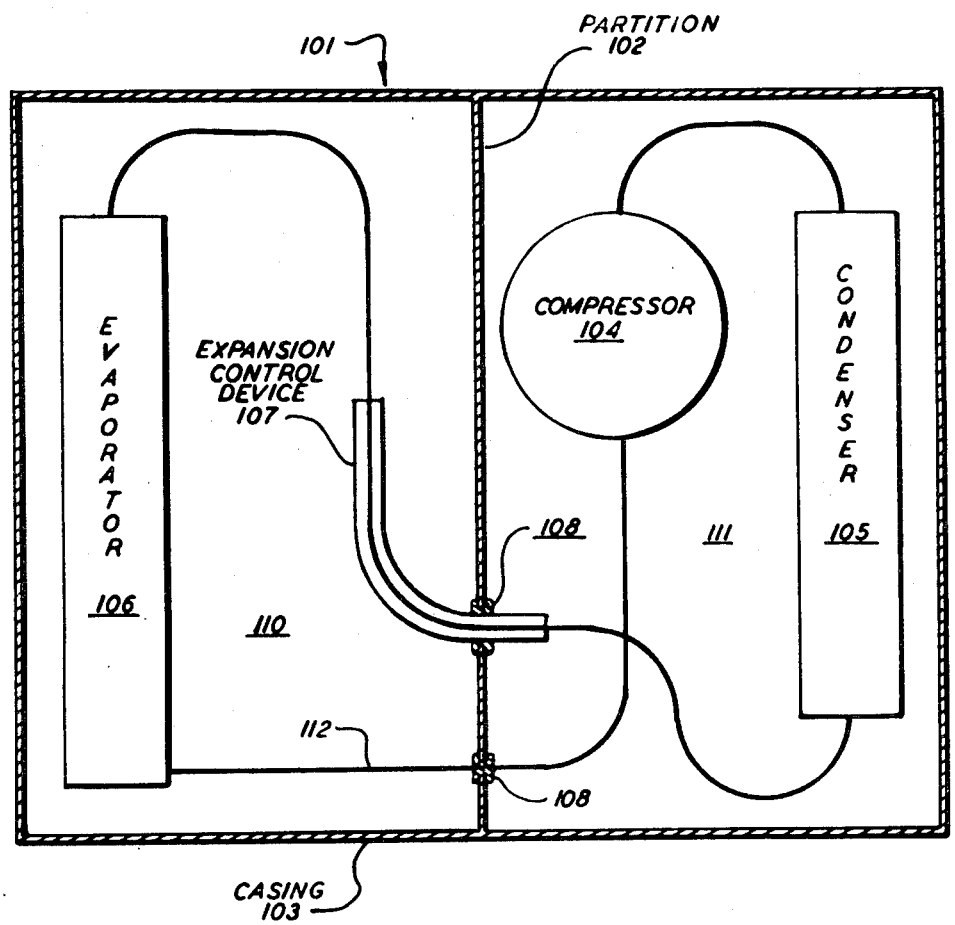
FIG. 4 is a plan view of a room air conditioner.

Referring to FIG. 4, a plan view of a typical room air conditioner 101 it can be seen that the casing 103 is divided by partition 102 into evaporator side 110 and condenser side 111. Condenser 105 and compressor 104 are mounted in the condenser side and the evaporator is in the evaporator side. Expansion control device 107 is shown as three capillary tubes running from the condenser to the evaporator through partition 102. Also shown running from evaporator 106 to compressor 104 is return line 112. Regions 108 are indicated to show typical application of this capillary plug button at the partition of a room air conditioner.

The invention has been described in detail with but it will be understood that variations and modifications can be effective within the spirit and scope of the invention.

What is claimed is:

1. A method of securing at least one small diameter component in an opening extending through a wall of a refrigeration machine which comprises the steps of:
   securing the component in a retainer plate having apertures for the receipt of the component, said step of securing including
   forming a slot in the retainer plate, said slot joining the apertures of the retainer plate to an exterior edge of the retainer plate;
   spreading the retainer plate such that the component may be slid into the slot therein;
   sliding the component into the slot to an aperture where the component may be secured; and
   releasing the retainer plate so that the component is secured within the aperture connected to the slot; and
   affixing the retainer plate to the wall, said retainer plate having a body attached thereto and at least one fastening leg formed from the body but movable separate therefrom and wherein the step of affixing further includes
   compressing the fastening leg; and
   inserting the compressed fastening leg through the opening in the wall such that the fastening leg resumes its original position contacting the wall on one side and the retainer plate contacting the wall on the other side such that the retainer plate is secured to the wall and the component are secured within the retainer plate.

2. The method as set forth in claim 1 wherein the body affixed to the retainer plate is generally cylindrical in configuration, and further comprising the steps of:
   providing separation slots in the body to form fastening legs therebetween, said fastening legs being displacable relative to the body; and
   the step of forming a slot in the retainer plate including forming an extension of the same slot through the body such that during the step of spreading the retainer plate the body is also spread enabling a component to be inserted through both slots into an aperture in the retainer plate.

* * * * *